(12) United States Patent
Hahn et al.

(10) Patent No.: US 8,808,938 B2
(45) Date of Patent: Aug. 19, 2014

(54) FUEL CELL SYSTEM

(75) Inventors: Robert Hahn, Berlin (DE); Christian Kunde, Magdeurg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/319,482

(22) PCT Filed: May 10, 2010

(86) PCT No.: PCT/EP2010/003040
§ 371 (c)(1),
(2), (4) Date: Feb. 23, 2012

(87) PCT Pub. No.: WO2010/127881
PCT Pub. Date: Nov. 11, 2010

(65) Prior Publication Data
US 2012/0141900 A1    Jun. 7, 2012

(30) Foreign Application Priority Data

May 8, 2009  (DE) .......................... 10 2009 021 057
May 22, 2009 (DE) .......................... 10 2009 022 946

(51) Int. Cl.
*H01M 8/04* (2006.01)
(52) U.S. Cl.
USPC ........... 429/439; 429/433; 429/434; 429/435; 429/436

(58) Field of Classification Search
USPC ......... 429/439, 443, 444, 433–436, 454–458, 429/512–514
See application file for complete search history.

(56) References Cited

U.S. PATENT DOCUMENTS

| | | | |
|---|---|---|---|
| 5,906,898 A | 5/1999 | Pondo | |
| 6,340,877 B1* | 1/2002 | Mita et al. | 320/112 |
| 6,503,650 B1 | 1/2003 | Yasuo et al. | |
| 7,508,663 B2* | 3/2009 | Coglitore | 361/695 |
| 7,560,190 B2* | 7/2009 | Ahn et al. | 429/120 |
| 7,643,291 B2* | 1/2010 | Mallia et al. | 361/695 |
| 7,709,137 B2* | 5/2010 | Shimizu | 429/120 |
| 8,003,245 B2* | 8/2011 | Lee et al. | 429/149 |
| 8,557,425 B2* | 10/2013 | Ronning et al. | 429/120 |

(Continued)

FOREIGN PATENT DOCUMENTS

| | | |
|---|---|---|
| DE | 102007007704 A1 | 8/2008 |
| DE | 102007036477 A1 | 2/2009 |
| EP | 1381104 A1 | 1/2004 |
| WO | WO2008098791 A2 | 8/2008 |

OTHER PUBLICATIONS

International Search Report and Written Opinion issued in PCT/EP2010/003040, mailed Sep. 23, 2010, 11 pages.

*Primary Examiner* — Muhammad Siddiquee
(74) *Attorney, Agent, or Firm* — Faegre Baker Daniels LLP

(57) ABSTRACT

A fuel cell system includes at least one cooling channel that extends between a housing and a fuel cell stack disposed within the housing. The cooling channel has an inlet and an outlet for producing a gas flow in the cooling channel. As a result, a gas flow may be used for cooling and at the same time may be used for ventilation of the cathode.

12 Claims, 11 Drawing Sheets

(56) References Cited

U.S. PATENT DOCUMENTS

| | | |
|---|---|---|
| 8,586,228 B2 * | 11/2013 | Lee et al. ............... 429/120 |
| 2003/0012986 A1 | 1/2003 | Koschany |
| 2004/0214057 A1 * | 10/2004 | Fuglevand et al. ........... 429/20 |
| 2005/0130007 A1 | 6/2005 | Cisar et al. |
| 2006/0269821 A1 | 11/2006 | Nakagawa et al. |
| 2007/0072051 A1 | 3/2007 | Sato |
| 2007/0099061 A1 * | 5/2007 | Na et al. ............... 429/38 |
| 2010/0119903 A1 * | 5/2010 | Hahn ............... 429/26 |

* cited by examiner

PRIOR ART

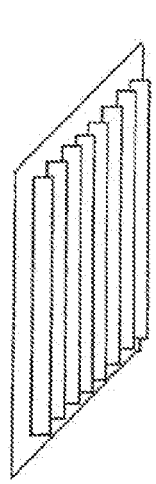
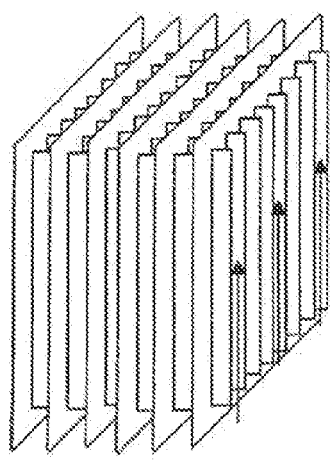
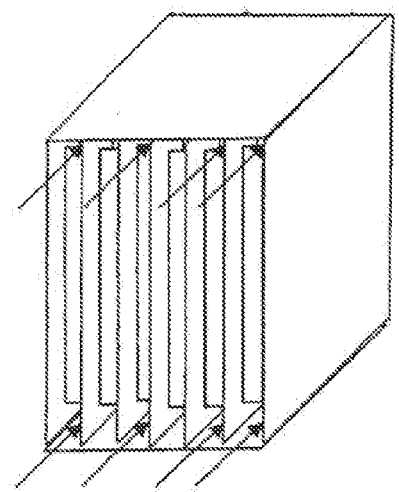
Fig. 7a  Fig. 7b  Fig. 7c
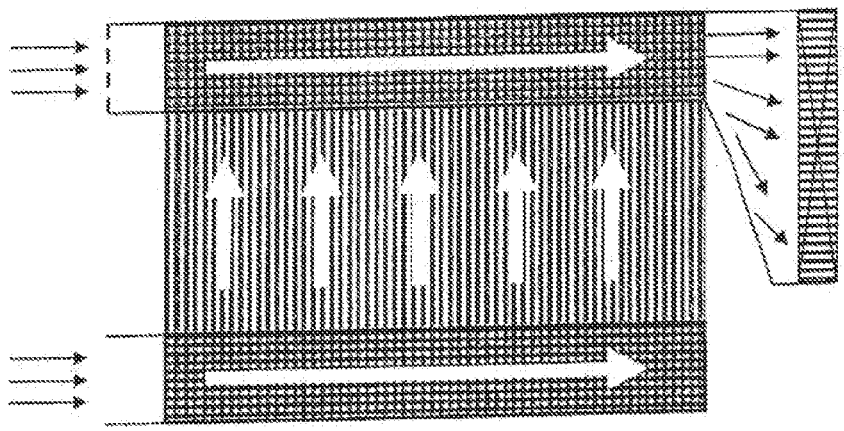
Fig. 8a
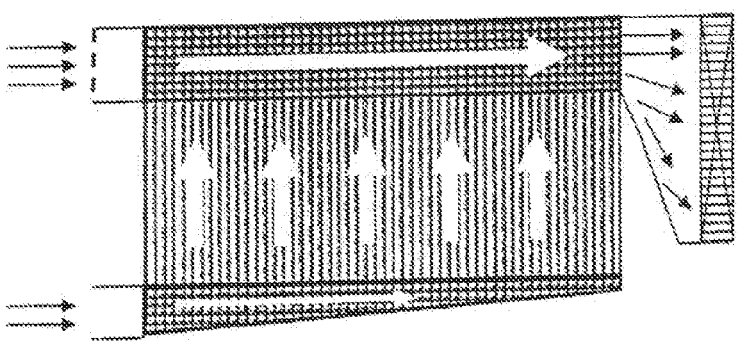
Fig. 8b

FUEL CELL SYSTEM

CROSS-REFERENCE TO RELATED APPLICATIONS

The present application is a national phase application of PCT/EP2010/003040, filed pursuant to 35 U.S.C. §371, which claims priority to DE 10 2009 021 057.1, filed May 8, 2009, and DE 10 2009 022 946.9, filed May 22, 2009. All applications are incorporated by reference herein in their entirety.

TECHNICAL FIELD

The present application relates generally to fuel cell arrangements.

BACKGROUND

Essentially, two construction variants of fuel cells are known in the state of the art. This on the one hand relates to stacked fuel cells (fuel cell stacks) which have a first air pump for cathode supply as well as a further fan for air cooling or a fluid cooling circuit for the cooling the fuel cells themselves. One example of such a fuel cell arrangement is U.S. Pat. No. 6,503,650 B1, which shows a water circuit which amongst other things cools the fuel cells themselves. The fuel cell arrangement has a ventilation unit with two fans which may blow or suck a gas flow into the cathode of a fuel cell in different directions, in order to ensure a ventilation of the cathode. For this purpose, a gas flow divider may be varied in its position, in order to find the suitable air distribution. With this, the gas flow is sucked in a region defined by the gas flow divider or blown through the cathode. It is ensured that the humidity of the cathode side, which is important for the functioning of the fuel cell, is not completely carried away out of the cathode, by way of setting the intensity of the blowing or sucking gas flow. At the same time however, one takes care that enough fresh air reaches the cathode. The disadvantage of this arrangement is the complicated construction and the energy-intensive operation of the fuel cell arrangement.

A further example of a structure for an efficient gas exchange is known from U.S. Patent Publication No. 2006/0269821 A1, which shows a fuel cell stack having at one of its sides a gas channel which is closed at one side and on which cathode channel openings connect in a manner such that the air introduced into the gas channel is blown out completely through the cathode channels and thus effects a gas exchange at the cathodes. The disadvantage of this arrangement is that the gas channel for leading the gas flow subsequently led into the cathode channels, must be weak, so that no humidity is led away out of the cathode channels and thus the efficiency of the fuel cell arrangement is not reduced.

These active systems are only suitable from a minimum power of approx. 10 Watt, since otherwise the peripheral components, i.e. the fan or the cooling components are no longer available in the necessary miniaturization, create costs which are too high in relation to the power density, lower the reliability of the system or themselves consume too much energy.

The second basic construction variant is the one planar, completely passive fuel cell, with which the reactant exchange at the cathode is effected alone by way of natural convection.

Such fuel cells are preferably applied in as small as possible miniaturized systems. The disadvantage of such fuel cells however is the large limitation of the power density and the dependency on the external conditions.

SUMMARY

In some embodiments, the present invention is directed to reducing the disadvantages of an active system and simultaneously creating a small inexpensive system which permits a greater power density than a passive fuel cell.

In some embodiments, the invention relates to a fuel cell arrangement with a housing with a first cross-sectional area perpendicular to a stack direction, with a fuel cell stack arranged in the housing and having at least one fuel cell which, arranged one after the other in the stack direction, includes an anode, an ion exchange unit and a cathode, wherein the fuel cell includes an active region with a second cross-sectional area perpendicular to the stack direction, which is smaller than the first cross-sectional area, and cathode channels are arranged running perpendicularly to the stack direction in a first direction, for the cathode-side gas exchange, and a ventilation unit, wherein a first cooling channel running between the at least one fuel cell and the housing in a second direction and having an inlet and an outlet is present, and the cathode channels are connected to the first cooling channel.

In some embodiments, the cathode channels may hereby be designed such that their entry and exit run out in the cooling channel or that only the entry is connected to the cooling channel, while the exit remains open and runs out on the housing.

A further embodiment envisages the anode including at least one first anode current collector, or the cathode including at least one first cathode current collector, respectively. The anode or cathode current detectors project into a cooling channel. In some embodiments, bipolar plates of the fuel cell may project into the cooling channel and are designed more thinly in this region or in this region do not have webs in the y-direction, with which the cathode channels are designed. Channels in the x-direction arise by way of this.

In some embodiments, a structure is arranged on the cathode side, via which the oxygen-containing gas may be led to the cathode and/or via which an electrical contacting to the cathode is ensured.

This structure may for example be a cathode-side separator structure. Such a structure may be manufactured very economically, for example with the injection molding method from plastics.

Another possibility for example envisages this being a conventional bipolar plate.

Here, basically (depending on the construction type), different types of plates may be arranged between the fuel cells. Due to the construction type, these may be electrically connected to adjacent parts or also electrically insulated. However, what is important here is a good thermal connection to the adjacent fuel cells, so that a good heat dissipation to the cooling channels is possible.

A further advantageous further embodiment envisages a second cooling channel running between the at least one fuel cell and the housing in the second direction and with an inlet and an outlet being present. In some embodiments, a fan may also be connected only to a single (thus to the first or the second) channel, and a coupling to both channels is of course also possible.

The invention is suitable for fuel cells of different construction types, for example for DMFC (direct methanol fuel cell) or PEMFC (proton exchange membrane fuel cell).

Further aspects of the invention are described hereinafter.

The fuel cell arrangement according to the invention includes a fuel cell stack held in a housing. With this, the fuel cell stack includes at least one fuel cell which, arranged one after the other with respect to a stack direction, includes an anode, an ion exchange unit, as well as a cathode. In some embodiments, the anode includes at least one first anode current collector. In some embodiments, the cathode includes at least one first cathode-side separator structure.

Viewed in the stack direction, the housing has a first cross-sectional area. The at least one fuel cell has an active region which has a second cross-sectional area, wherein the active region is often limited by the cross-sectional area of the ion exchange unit which is viewed in the stack direction. The active region has a second cross-sectional area which is smaller than the first cross sectional area. As a result, the fuel cell stack does not cover a part of the first cross-sectional area. The term "active region" is to be understood as that region, at which the electrochemical reaction takes place.

Along the active region, and in some embodiments, a separator structure or cathode channels, in a first direction which may run perpendicularly to the stack direction, includes or include guide structures which serve for the gas exchange on the cathode-side. Structures, as were disclosed for example in the document WO 2008/098791 A2, are in particular considered as separator structures. This means that the separator structure on the one hand may include channels running in an exactly defined manner, but is only supported by individual pins on the remaining elements of the fuel cell, in particular parts of the anode, and thus includes channels with a course which is not unambiguously defined. Artificial resins, woven materials from plastics or likewise are considered as materials for such a separator structure, as already described in WO 2008/098791 A2, and typical bipolar plate materials such as graphite, filled plastics or metal are also considered.

According to the invention, the fuel cell system includes a first and a second cooling channel running between the at least one fuel cell and the housing in a second direction. Hereby, the first or the second cooling channel in particular runs in a part region of the first cross-sectional area which is not covered by the active region. The second direction, with this, may run parallel to the stack direction or perpendicular to this. In some embodiments, the second direction however runs perpendicularly to the first direction. The first as well as the second cooling channel which run along the fuel cell stack in the second direction, have an inlet and an outlet. A gas flow may be led through the respective cooling channel through the inlet and the separate outlet.

Moreover, the separator structure connects the first and the second cooling channel such that a gas flow may run from the first cooling channel to the second cooling channel and vice versa. In some embodiments, the connection includes further openings which are not identical to the inlet and outlet, in order to permit the gas exchange between the first and the second cooling channel along the separator structure.

It is possible by way of such an arrangement, to send a gas flow each through the first or the second cooling channel, which is introduced at the inlet and is led out at the outlet. Since the first cooling channel is connected to the second cooling channel by way of the separator structure, in the case that a pressure, in particular static pressure within the context of Bernoulli, is present in the first cooling channel which is different to that in the second cooling channel, a gas flow may be effected along the separator structure which merely arises on account of the different pressures in the first and in the second cooling channel. This arrangement has great advantages compared to the state of the art: on the one hand it is possible to effect a cooling of the fuel cells along the cooling channels with relatively strong gas flows. In order at the same time to effect a gas exchange at the separator structure, which however must be designed significantly more weakly than the gas flow for cooling the fuel cell arrangement, on account of the humidity remaining and present at the cathode, the gas flows or the dimensions of the first and second cooling channel or their inlets or outlets are selected such that a different static pressure is present in both. The pressure difference between the first and the second cooling channel then effects a gas flow which is significantly weaker than the cooling gas flow.

Here for example, an active fan is considered as a ventilation unit, which actively blows air or another gas containing oxygen into the respective inlet of the first or the second cooling channel or sucks it out of the outlet of the first and second cooling channel. Hereby, it is possible in one embodiment of the fuel cell arrangement, to merely use one fan for the first as well as the second cooling channel.

In another embodiment, it is possible to apply no active fan, but to select the natural convection through an inlet common to the first and second cooling channel, wherein the different pressures in the first and second cooling channel are created on account of a passive flow divider. In this manner for example, the oncoming air flow of a vehicle may be utilized for cooling. Only pressure differences in the first and in the second cooling channel need to be present, in order at the same time to effect the cooling and the gas exchange along the cathode, and these pressure differences may be caused by way of different constructional measures.

In a first embodiment, the difference between the first pressure and the second pressure is selected in manner such that the gas flow through the at least one separator structure is smaller than the gas flow through the first or second cooling channel by a factor of 5 and 1000, ensuring that the gas flow led through the cooling channel is sufficiently strong for cooling the fuel cells, wherein the gas flow led through the separator structure only serves for the gas exchange and does not effect a drying out of the cathode. At the same time however, it is ensured that enough fresh air or gas is available at the cathode, in order to maintain the reaction which is present at the ion exchange unit.

In a further embodiment, the at least one first cathode current collector or the at least one first anode current collector projects into the first and/or second cooling channel. A particularly efficient cooling of the fuel cell may be achieved by a gas flow led into the cooling channels, by way of an extension of the current collectors, in particular of the cathode current collector, into the cooling channel itself. Hereby, it is particularly good heat-conducting metals such as copper or aluminium which are suitable.

The current collectors may project from the active region up to the inner edge of the housing, in order thus to effect an optimal cooling of the fuel cell stack. At the same time, the geometry of the regions of the current collectors which project into the intermediate space between the active region and the second cross-sectional area, may be selected in a manner such that a different static pressure is effected in the first and the second cooling channel and thus the pressure difference is utilized for the gas exchange along the separator structure.

Apart from metallic current collectors, extensions of the fuel cell plates themselves (graphite, metal) may be extended into the region of the cooling channel. What is important is an adequate thermal conductivity and thickness, in order to be able to securely lead away the waste heat. Moreover, the height of the active region of the fuel cell in the y-direction is to be adapted such that the temperature variation arising in the y-direction by way of leading the heat away is not too large (smaller than a few Kelvin). In some embodiments therefore, the fuel cell would tend to be narrower in the y-direction and instead be longer in the x-direction.

In a further embodiment, the first and the second cooling channel are arranged in a manner such that, viewed along the second direction, they are arranged on sides of the fuel cell stack which lie opposite one another. In this manner, apart from the static pressure, one may also utilize the gravitational pressure of the gas, in order to set an additional share with the gas flow through the separator structure.

In a further embodiment, the cross-sectional area of the first cooling channel which runs perpendicularly to the second direction is larger than a cross-sectional area of the second cooling channel. The cross-sectional area of the cooling channels represents a particularly simple possibility of creating different static pressures in the first and in the second cooling channel.

A further possibility is given by a further embodiment, with which the inlet of the first cooling channel and the inlet of the second cooling channel or the outlet of the first cooling channel and the outlet of the second cooling channel, are each dimensioned differently and the different pressure conditions are caused in this manner. A further possibility of effecting different pressures in the first and in the second cooling channel lies in designing the gas flow in the first cooling channel to be quicker compared to the gas flow in the second cooling channel. A different static pressure between the first and second cooling channel, and accordingly a gas flow in the separator structure, is built up by way of this.

In a further embodiment, it is possible to connect the inlet of the second cooling channel to the outlet of the first cooling channel, wherein for example a pressure difference in the first and second cooling channel and thus a gas flow in the separator structure is effected for example due to the dimensions of the outlet or of the inlet or of the cross-sectional area of the cooling channels.

In a further embodiment, the inlet and/or the outlet of the first or the second cooling channel includes means for adjusting a size of the cross-sectional area of the inlet or of the outlet, so that the ratio of the pressures present in the cooling channel may be set in a variable, as the case may be infinite manner. Thus one may react in an infinite or stepped manner to different operating conditions by way of this.

An adjustment may include an enlargement or reduction of the cross-sectional area. For this, one may for example envisage a device, by way of which the plates which partly cover the opening of the cooling channel, being moved in front of this opening or being removed from the opening.

In a further embodiment, the ventilation unit includes exactly one fan which effects the gas flow in the first as well as the gas flow in the second cooling channel. Thereby, the fan may be arranged symmetrically or asymmetrically to the first and to the second inlet or outlet, wherein one may fall back on the already described possibilities for producing different pressures in the first and in the second cooling channel.

In some embodiments, a multitude of fuel cells are present, in order to increase the power of the fuel cell arrangement, wherein with regard to the fuel cells it is preferably the case of a bi-fuel cell. The disclosure of WO 2008/098791 A2 is also referred to with regard to this.

The invention is hereinafter explained by way of a few representations. In particular, the individual features of the arrangements per se may be combined with other embodiments.

BRIEF DESCRIPTION OF THE FIGURES

FIGS. 7a-c illustrate schematic representation of bipolar plates and cathode channels;

FIGS. 8a-e illustrate different configurations of cooling channels and fans; and FIGS. 9-14b illustrate diagrams for explaining quantitative contexts of the invention.

DETAILED DESCRIPTION

Figure 1:
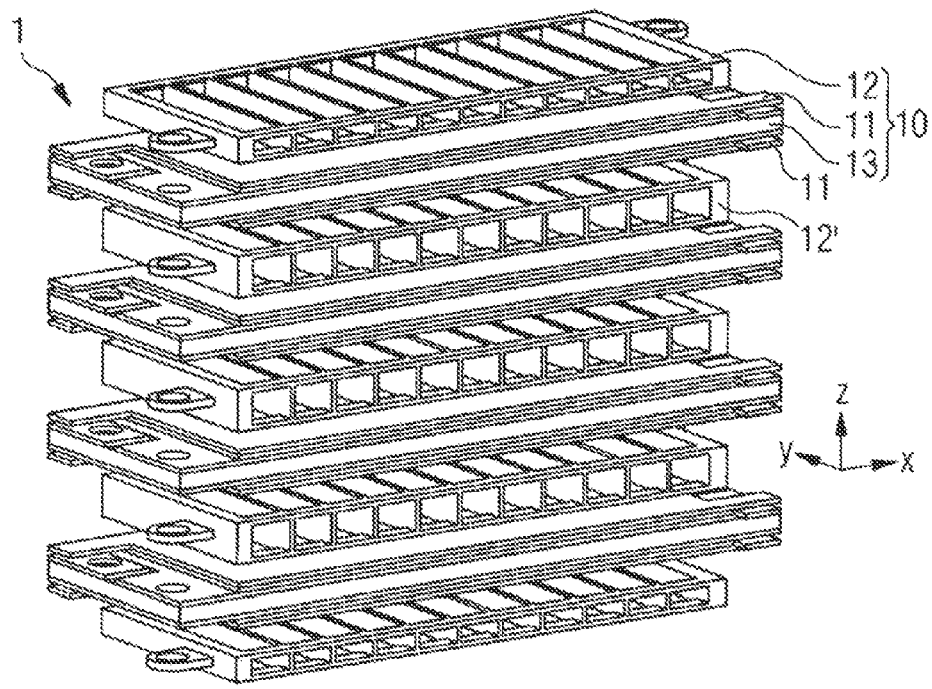
FIG. 1 illustrates a fuel cell stack according to the state of the art.

FIG. 1 shows a fuel cell stack 1, as is disclosed for example in WO 2008/098791 A2. The fuel cell stack 1 includes a multitude of fuel cells 10 which in the present example are designed as bi-fuel cells. The fuel cells are stacked along the stacking direction z. The bi-fuel cells include a fuel distribution structure 13, a cathode current collector 11 and a separator structure 12. With this, a cathode current collector 11 is arranged each on both sides of the fuel distribution structure 13, viewed in the z-direction. The same applies to the separator structures 12 and 12'.

One may already recognize from FIG. 1, that the separator structure 12 includes channels which run along a first direction y and which serve for the cathode-side gas exchange. Fuel feed connections as well as parts of the cathode current collector are visible at the edges of the fuel distribution structure, said edges each lying in the x-direction. The exact manner of functioning is known from the state of the art.

Figure 2A:
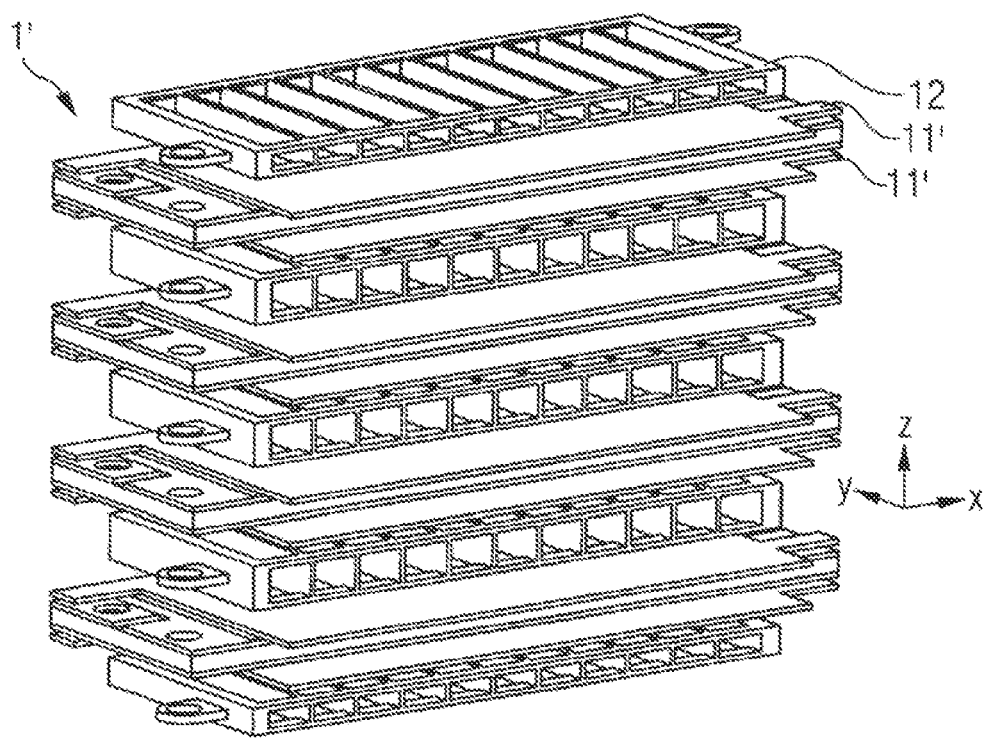
FIGS. 2a, b illustrate further fuel cell arrangements according to the state of the art.
Figure 2B:
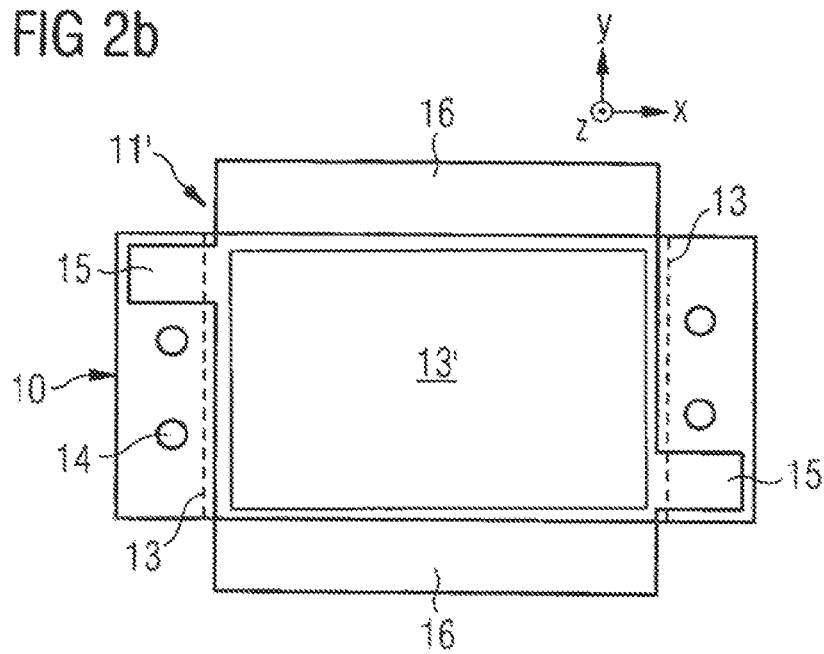

One variant of a fuel cell stack 1' is represented in FIG. 2a. In contrast to the fuel cells stack 1, the fuel cells stack 1' includes changed cathode current collectors 11'. Hereby, the cathode current collectors are extended in the first direction past the fuel distribution structure 13. This is clearer when considering FIG. 2b. FIG. 2b shows the fuel distribution structure 13 with a cathode current collector 11' applied thereon, i.e. is stacked in the z-direction. One may clearly recognize that seen in the y-direction, the cathode current collector 11' extends in the y-direction past an active region 13' which is delimited by the dashed lines of the fuel distribution structure 13. Since the cathode current collector projects over the active region 13' of the fuel cell 10, a gas flow which hits the extension 16' may contribute to the cooling of the fuel cell 10.

Moreover, the fuel distribution accesses 14 as well as the current contacting field 15 of the cathode current collector 11' should be mentioned, via which electricity produced in the fuel cell may be led away.

The fuel cell stack 1' which is represented in FIG. 2a includes four bi-fuel cells. One may of course also add more bi-fuel cells in the stack direction z in the arrangement known from the state of the art, should this be necessary. It is also possible to only use conventional fuel cells, wherein a more simple fuel distribution structure 13 may then be selected, which in particular has an ion exchange unit only to one side.

One embodiment variant of a fuel cells system according to the invention is to be explained by way of FIGS. 3a to d. The fuel cells stack 1' which is represented in FIG. 2a is shown in a different orientation in FIG. 3a. Thereby, the fuel cell stack is covered with a housing 2, with which in particular the end plates of the housing 2 which delimit the fuel cell stack 1' in the z-direction are shown. It is evident by way of the representation of FIG. 3a that the cathode current collectors 11', as is represented in FIGS. 2a and 2b, project beyond the active region of the fuel cell 10. In particular, a fuel distribution structure 13 and a separator structure 12 are represented alternately.

Figures 3A, 3B:
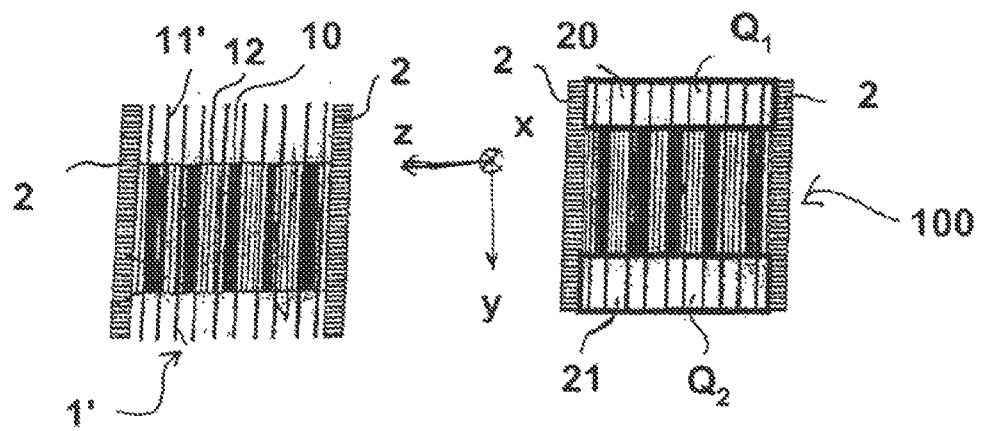
FIGS. 3a-d illustrate embodiment variants of a fuel cell arrangement according to the invention.

An upper and a lower cover of the fuel cell stack 1' are represented in FIG. 3b. The housing 2 of the fuel cell arrangement 100 is closed off by way of this. A first cooling channel 20 and a second cooling channel 21 which extend along a second direction x, are defined by way of this. Thereby, the first cooling channel 20 has a cross sectional area $Q_1$, wherein one is to take into account the fact that the cross section of the cathode current collector 11' does not contribute to the cross section $Q_1$ of the cooling channel 20. The same applies to the cross sectional area $Q_2$ of the second cooling channel 21. Hereby, one is to note that the cross-sectional area $Q_1$ is smaller than the cross sectional area $Q_2$.

The stack direction of the fuel cell arrangement 100 is the z-direction. The first direction, along which the channels of the separator structure run, is the y-direction. The second direction, along which the first and the second cooling channel extend, is the x-direction.

Figure 3C:
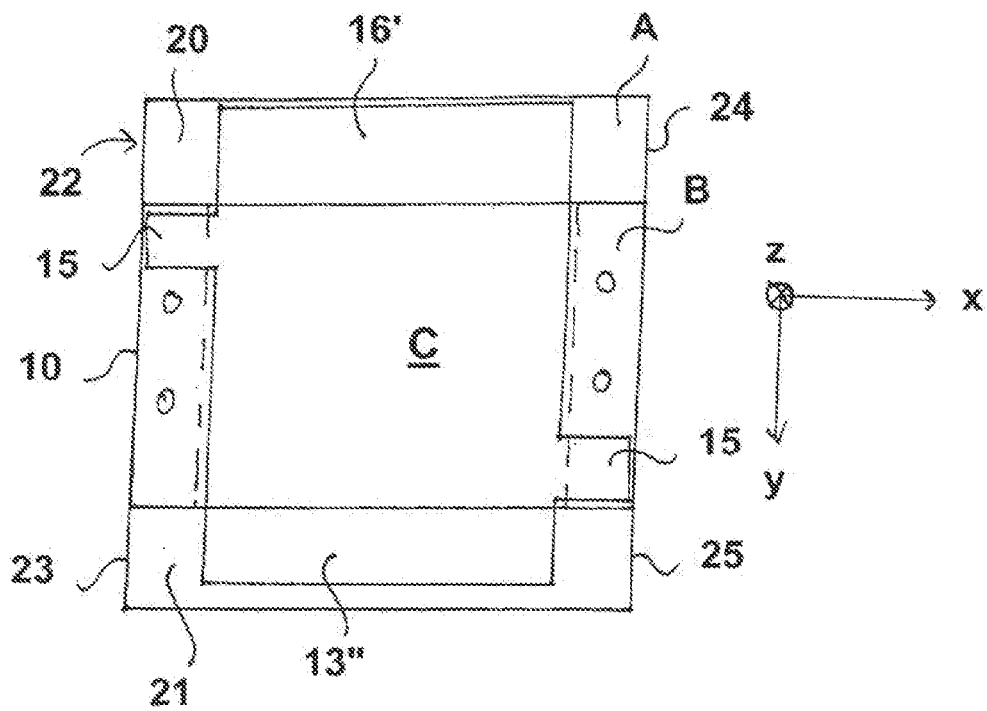

A cross section along the x-y plane of FIG. 3b is shown in FIG. 3c.

Figure 3D:
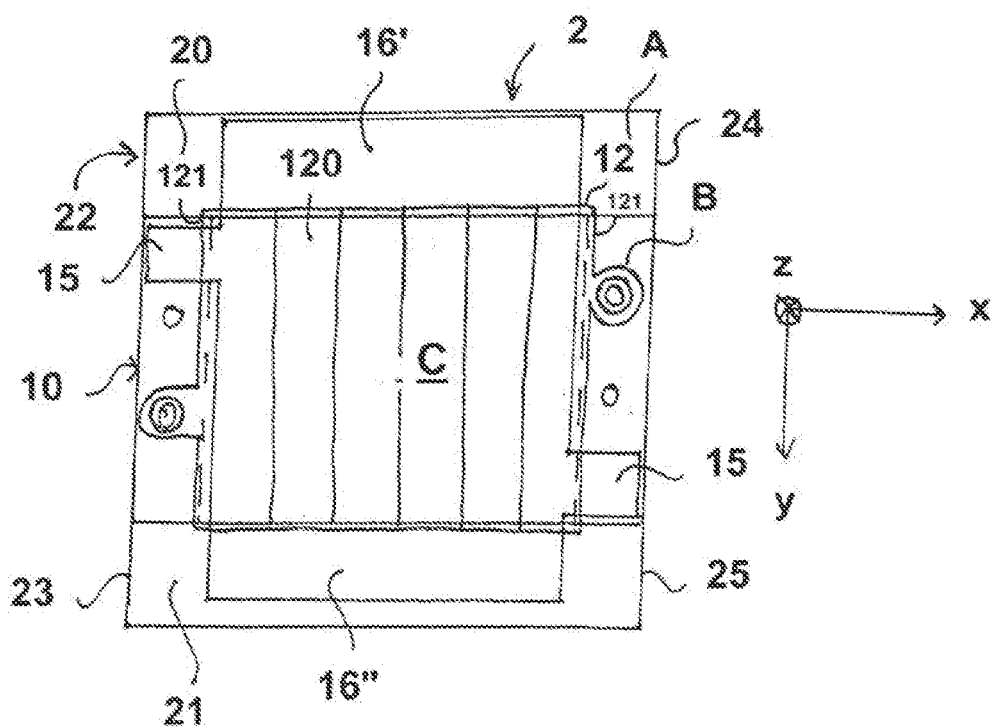

Compared to the representation of FIG. 2b, the housing 2 of the fuel cell arrangement is now represented. In this representation, the housing 2 has a first cross-sectional area A. The fuel cell distribution structure 13 of the fuel cell 10 takes up a cross-sectional area B, wherein the difference between the cross-sectional area B and the cross-sectional area A essentially forms the cross-sectional area of the cooling channels 20 and 21. The active region of the fuel cell 10 has a cross-sectional area C which is likewise smaller than the cross sectional area A. An inlet 22 of the first cooling channel 20 is additionally to be recognized. Analogously to this, the second cooling channel 21 likewise has an inlet 23 and an outlet 25. Moreover, one may recognize that the cathode current collector projects with a region 16' into the first cooling channel 20. With this, the cathode current collector extends over a width measured in the x-direction, from the fuel distribution structure 13 up to the edge of the housing 2. A region 16" projecting into the second cooling channel 21 only fills out a part-region of the fuel distribution structure and the edge of the housing. If now a gas flow of equal speed is introduced into the inlet 22 or the inlet 23, wherein the inlets 22 and 23 as well as the outlets 24 and 25 have the same size, a greater static pressure along the cross section $Q_1$ than in the second cooling channel 21 builds up on account of the cross-sectional area $Q_1$ of the first cooling channel 20 which is significantly smaller in the y-z plane. Since, as is shown in FIG. 3d, a connection between the first cooling channel 20 and the second cooling channel 21 is created on account of the separator structure 12 and the channels 120 arranged therein, a gas flow arises along the channels 120, wherein the speed or the intensity of the gas flow depends on the pressure difference between the first cooling channel 20 and the second cooling channel 21.

A significant element of the fuel cell arrangement is thus the fact that the inlet and the outlet of the first or second cooling channel are present additionally to the connection between the first and the second cooling channel. In this manner, one may each lead strong gas flows suitable for cooling through the first and the second cooling channel, wherein simultaneously a significantly smaller gas flow along the channels 120 of the separator structure 12 is effected, due to the forming pressure difference between the first and the second cooling channel.

In the example represented in FIG. 3c, the pressure difference between the first cooling channel 20 and the second cooling channel 21 is created by way of the cathode current collector 11" projecting differently far into the respective cooling channel. The cross-sectional area of the cooling channels observed in the z-y plane differs significantly on account of this. However, of course it is likewise possible to design the first cooling channel larger or smaller than the second cooling channel 21 and to produce a pressure difference on account of an equal quantity of introduced gas. With such an arrangement, it would likewise be possible to merely lead a gas flow into the inlet 22, lead it out of through the outlet 24 and subsequently lead it into the outlet 25 of the second channel 21 and lead it out again through the inlet 23 of the second cooling channel 21. Due to different cross-sectional areas, a pressure difference between the first and second cooling channel would however occur, so that a gas flow would be set up along the channels 120. With this variant however, the cooling power is reduced compared to two gas flows in the cooling channels running in the same direction.

Figure 4:
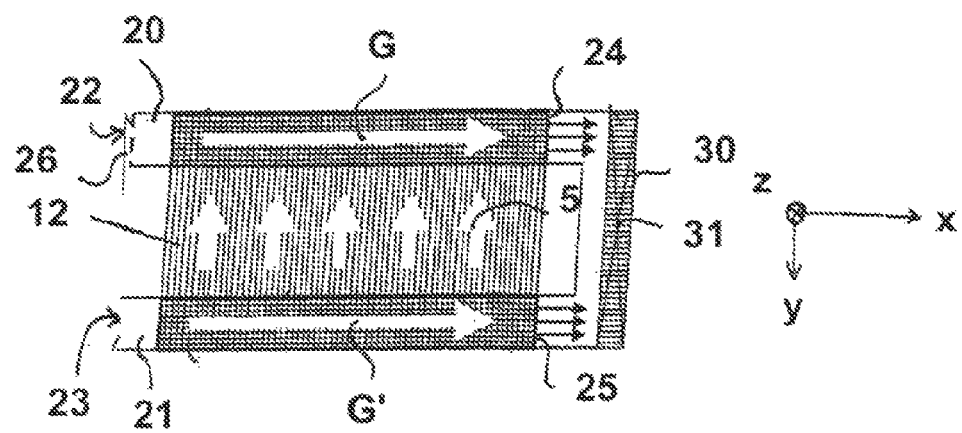
FIG. 4 illustrates schematic acting manner of a fuel cell arrangement according to the invention.

Further possibilities for producing a pressure difference between the first and the second cooling channel are considered with regard to FIG. 4. The cross-sectional areas of the first and second cooling channel 20, 21 seen in the z-y plane, are identical. The cross section of the outlets 24 and 25 is likewise identical. However, the inlet 22, with regard to the cross section, is smaller than the inlet 23, wherein an identical quantity of gas per area is led to the inlet 22 as also the inlet 23. This is effected by way of the ventilation device 30 which includes exactly one fan. Due to the fact that a lower quantity of gas is sucked through the inlet 22, a pressure difference between the first cooling channel 20 and the second cooling channel 21 arises. The pressure difference arising between the second cooling channel 21 and the first cooling channel 20 due to the different speeds, effects the occurrence of a gas flow S in the separator structure 12.

A device 26 for the selective enlargement or reduction of the cross-sectional area of the inlet may be arranged on the inlet 22, in order to effect an improved control of the gas flows G, G' as also S. An additional flow resistance is designed in a variable manner by way of this, wherein an exact control of the gas flow S is possible by way of varying the cross-sectional area of the inlet 22.

Figure 5:
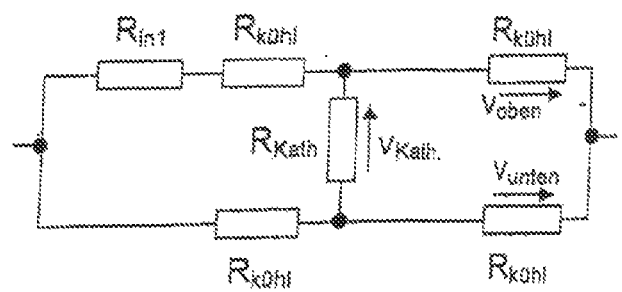
FIG. 5 illustrates equivalent electric circuit of a fuel cell arrangement according to the invention.

This is illustrated in the equivalent electrical diagram of FIG. 5. The reduced cross-sectional area of the inlet 22 effects the connection of an additional resistance $R_{in1}$. Since the flow resistance in the remaining regions of the first cooling channel 20 and of the second cooling channel 21 are each identical at $R_{kühl}$, a flow flows from the second cooling channel 21 to the upper cooling channel 20 via the resistance of the cathode-like separator structure $R_{kath}$. This is illustrated by the speed $v_{kath}$. It is likewise clear from the equivalent circuit diagram, that the gas flow speed $v_{oben}$ of the first cooling channel only differs slightly from the flow speed $v_{unten}$ of the second cooling channel 21.

Figure 6:
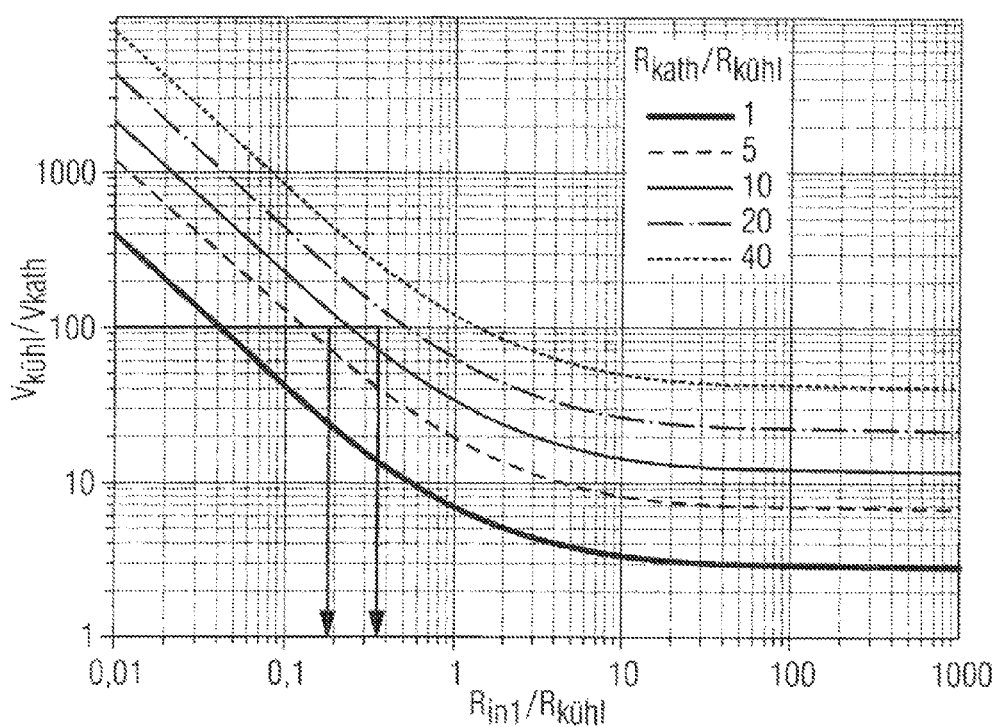
FIG. 6 illustrates a schematic overview of settable gas flow conditions in the cooling channel and the separator structure.

The details of FIG. 6 are also to be interpreted in the light of this. Different ratios between the equivalent electrical resistances $R_{kath}$ and $R_{kühl}$ are represented in FIG. 6. Thereby, the ratio $R_{kath}$ to $R_{kühl}$ is indirectly proportional to the cross-sectional area at the cooling channels and the cathode-side channels. The ratio of the inlet resistance $R_{in1}$ to the resistance $R_{kühl}$ is indicated on the abscissa. The ratio of the gas flow through the cooling channels to the gas flow through the separator structure is represented on the ordinate. This means that the "1000" on the ordinate means that the gas flow through the cooling channel is 1000× stronger than the gas flow through the separator structure. It makes sense to design the ratio of the gas flow of the cooling channels to the gas flow of the separator structure between 5 and 1000, in order to ensure an efficient operation of the fuel cell arrangement. Now, by way of example and by way of FIG. 6, it is explained how the ratio of the inlet resistance and of the resistance of the cooling channel may be set to one another with a gas flow ratio of 100. If the ratio of the resistance $R_{kath}$ to $R_{kühl}$ is 5, the resistance $R_{kühl}$ is 10× larger than the inlet resistance $R_{in1}$. If the ratio of $R_{kath}$ to $R_{um}$ is 20, the ratio is 7:10.

The embodiments represented in FIGS. 5 and 6 are each based on a sucking ventilation device which is arranged on the outlet, wherein an inlet has a lower cross-sectional area. With a changed arrangement, for example with a fan which is arranged in a blowing manner at the inlets, the values change in an analogous manner. The cross-sectional dimensions of the cathodes and of the cooling channels lie in the magnitude between 1×1 and typically 2×2 mm. The length of the cathodes at the cooling channel is between 0.5 and 20 cm. In some embodiments, the length of the cathodes at the cooling channel is between 1 and 10 cm.

FIG. 7a shows a schematic representation of a bipolar plate that includes a plate plane with a surface region which here is essentially rectangular, on which webs are drawn on the right, said webs representing the cathode-side air channels. The anode-side channels and the actual fuel cell (gas diffusion layers, MEA) are arranged on the distant side (not visible in FIG. 7a).

FIG. 7b shows a stack of bipolar plates and fuel cells. Perpendicular air channels in the y-direction arise by way of this (see arrows in FIG. 7b).

FIG. 7c shows air channels in the x-direction (see arrows in FIG. 7c) which arise by way of the arrangement of a cover at the top and bottom, and serve for cooling and also for the airflow in the cathodes. The thermal conductivity of the bipolar plates or of the material of the fuel cell which projects into the region of the cooling channels must be adequate in the y-direction. Inasmuch as this is concerned, DE 103 06 081 A1 is referred to, wherein the thermal conduction in the x-direction is described.

Further configurations are described hereinafter, mentioning key terms.

FIG. 8a shows how the air is only sucked via the upper cooling channels. By way of this, one may obtain a higher flow speed in the perpendicular cathode channels, in the case that the flow resistance in the cooling channels is large compared to the resistance in the cathode channels. The cooling effect in the upper channels thereby is larger than in the lower ones. The temperature variations in the fuel cell however are small in case of good thermal conductivity of the materials.

The main cooling is only effected through the upper cooling channel in FIG. 8b. The lower channel is shaped such that above all, it effects a uniform distribution of the air in the individual cathode channels. This, as is shown here, may be designed in a trapezoidal manner, but also with any curve shapes.

Figure 8C:
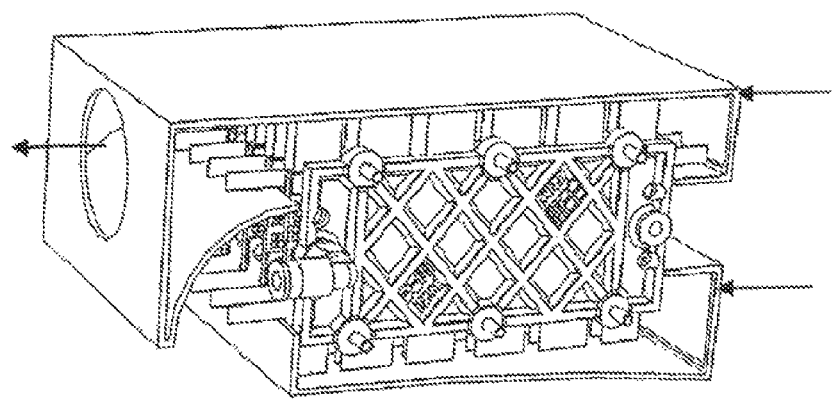

FIG. 8c shows an embodiment according to FIG. 8b, wherein the air direction is however drawn in from the right to the left. In the suction region of the fan, a curved wall is used, in order to produce a homogeneous air flow in the upper cooling channel, although the fan is arranged in a non-symmetrical manner.

Figure 8D:
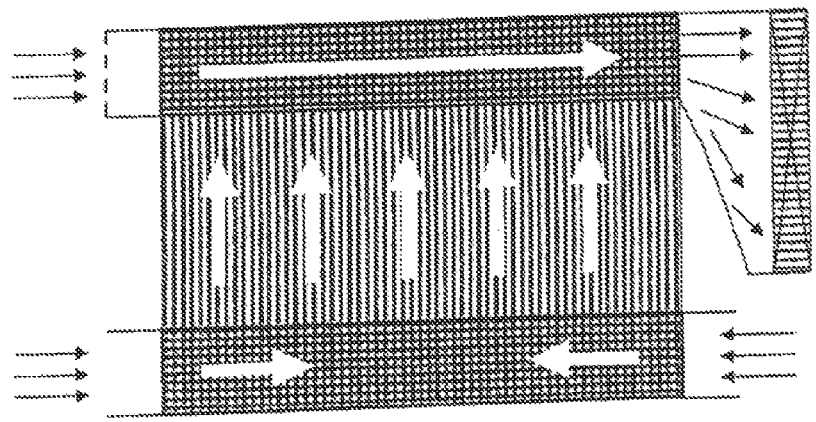

FIG. 8d shows one variant of the configuration shown in FIG. 8a, in which the fan is connected only to the upper air channel. In this case, the air may be sucked at the bottom also from both sides.

Figure 8E:
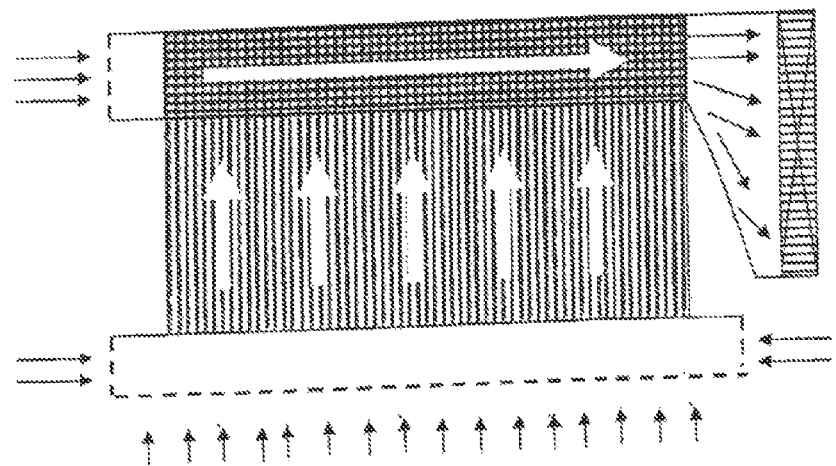

FIG. 8e shows a variant to FIG. 8d, with which the air may also be sucked over the whole lower region of the stack. Measurement Results are Described Hereinafter.

A model for a fuel cell was set up and the humidity and temperature as a function of the fuel cell current and of the fan power was computed and verified with regard to measurement technology. Thereby, above all the water management of the PEM fuel cell was considered. Since the humidity uptake capacity of the air increases exponentially with the temperature, the fuel cell membranes may easily dry out with too high temperatures and too high air flows in the cathode channels.

The fuel cell includes 10 individual cells each with an active area of 10 cm$^2$ (5×2 cm$^2$). The height of the cooling channels is 10 mm and includes extended current collectors of aluminium sheet metal.

The cross sectional ratio of the channels of the cathodes and of the cooling channels is selected such that about 25 times more air flows through the cooling channels.

In the case of the theoretically maximal heat transfer from the fuel cell to the cooling air, thus if the cooling air could be heated to the core temperature of the fuel cell, a minimal ratio of 3:1 between cooling air and cathode air would have to be set. The worse the heat transfer to the air, the greater must the ratio be selected.

Figure 9:
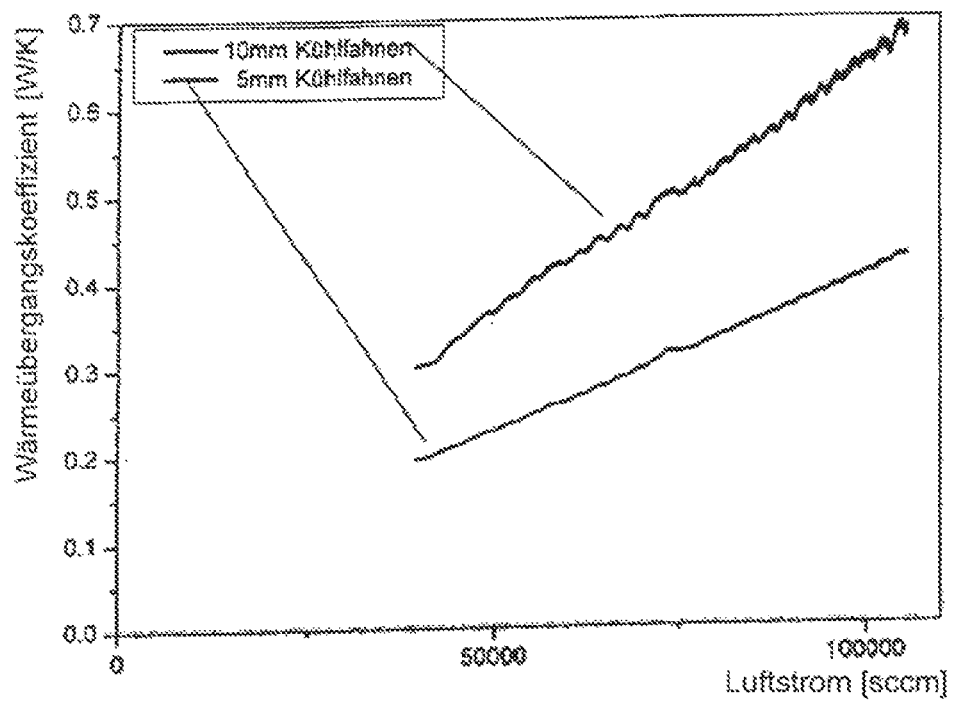

FIG. 9 shows the measured heat transfer coefficient of the complete arrangement for 5 mm and 10 mm high cooling sheet metal parts or cooling channels. The computations were carried out with this heat transfer coefficient.

Figure 10:
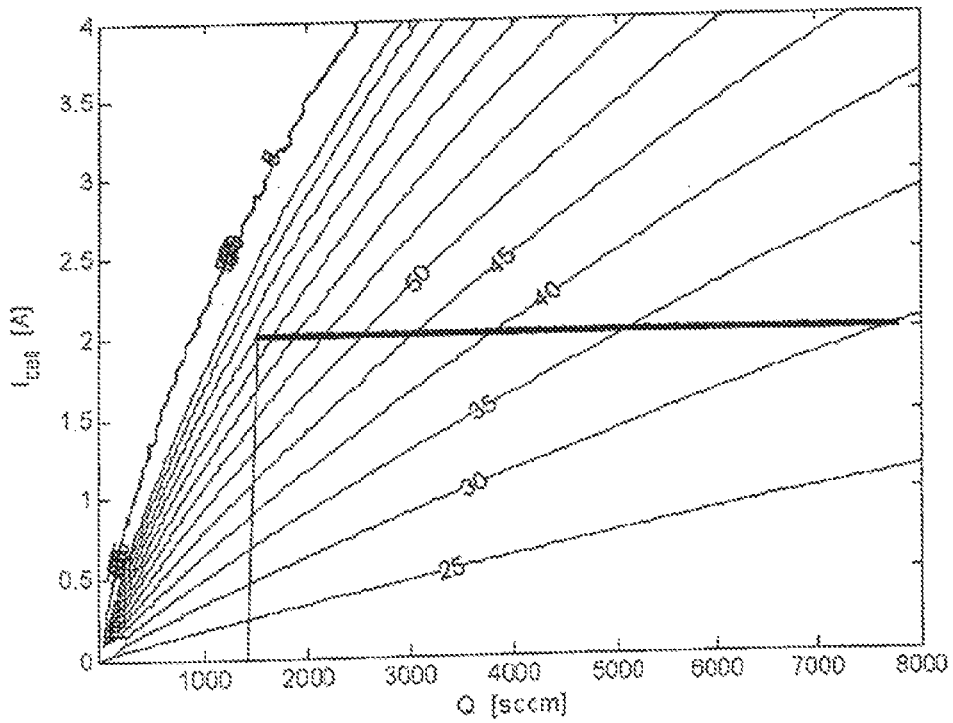

FIG. 10 shows the temperature as a function of the cell flow of the air flow in the cathode channels. The air quantity in the cooling channels is accordingly 25 times greater. The surrounding temperature is 25° C. With a current of 2 amperes, thus about. 1400 sccm (milliliters per minute) of airflow in the cathode channels or 35 liters per minute total air flow is required, in order to keep the stack temperature below 70° C.

Figure 11:
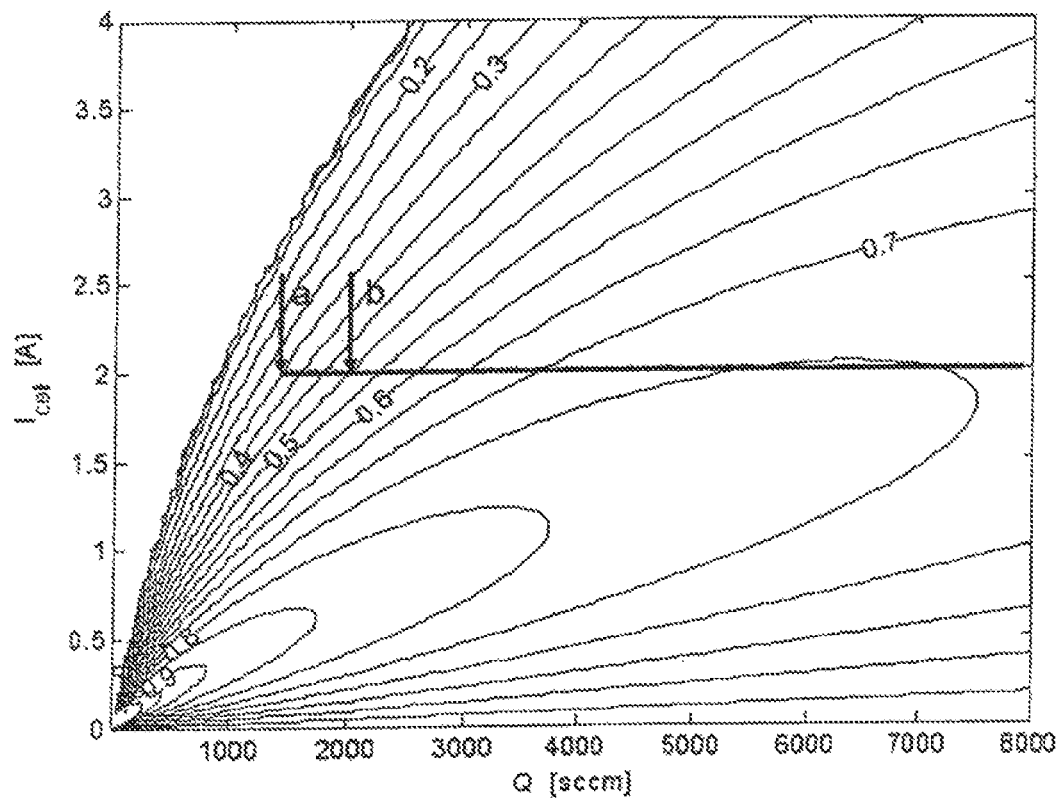

FIG. 11 shows the relative humidity of the air flowing out of the fuel cell, with an assumed relative humidity of the surroundings of 50%. With 1400 sccm air quantity in the cathodes, where a temperature of 70° C. is achieved, the relative humidity is approx. 35% which would lead to the fuel cell drying out (arrow a). The air quantity should be increased to at least 2000 sccm (arrow b), where 50% relative humidity is achieved. A maximal humidity of approx. 75% is achieved with a further increase of the air quantity and a reduction of the temperature. The fuel cell may be securely operated in this complete range. Only when exceeding approx. 90% relative humidity is there a danger of a flooding of the cathodes. Thus by way of the design of the fuel cell and the air quantity ratio and the heat transfer coefficient which is set with this, one ensures that a fan setting may easily be found, with which a drying-out is prevented, and flooding is not possible at all.

Figure 12:
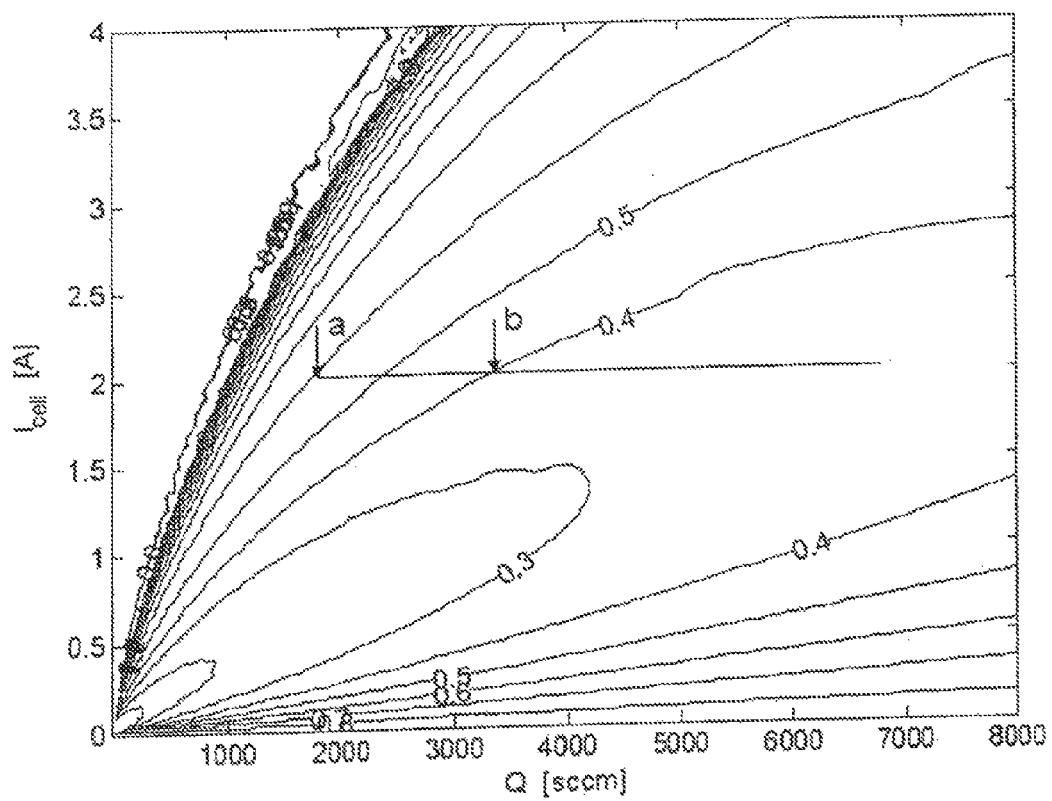

FIG. 12 shows the specific resistance (Ohm*m) of the fuel cell membrane as a function of the operating parameters. The specific membrane resistance is directly coupled to the humidity (FIG. 9). If the airflow is doubled from about 14 sccm to about 3000 sccm, one may reduce the specific resistance from 0.6 to 0.4 Ohm*m and thus reduce the internal resistance.

Figure 13:
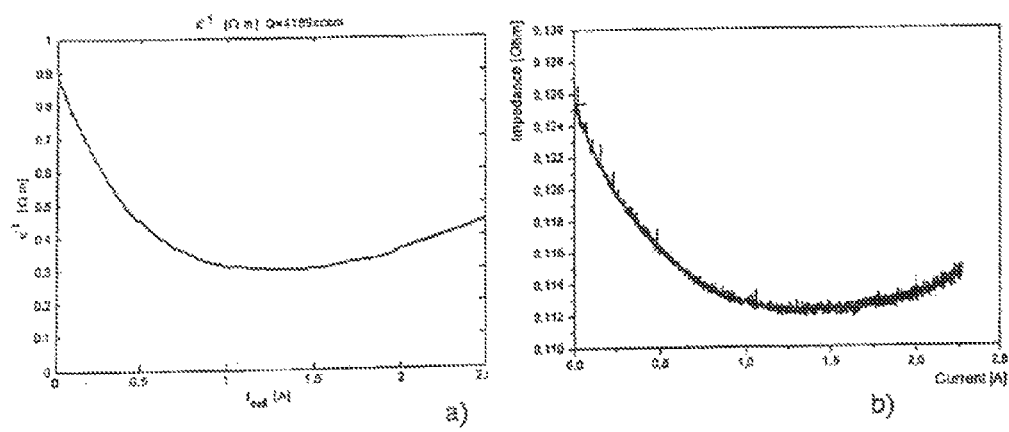

FIGS. 13 a) and 13 b) show the course of the modelled membrane conductivity as a function of the current with a constant airflow of about 4200 sccm (a), and the impedance of a middle cell of the fuel cell stack (b) which is measured at 1 kHz. One recognizes the good agreement. A minimum results between about 1 and 1.5 A.

Figure 14:
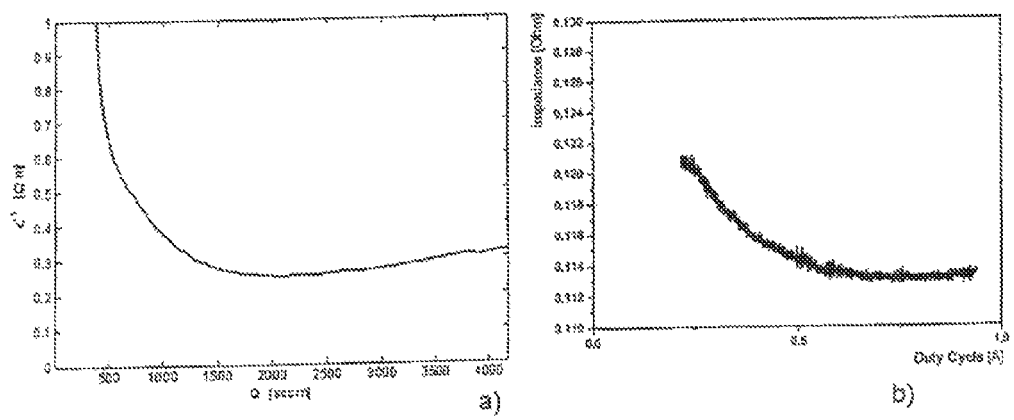

FIG. 14 shows the course of the modelled membrane conductivity with a constant current of 910 mA and varied airflow and the impedance of a middle cell measured at 1 kHz. Thereby, the rotational speed of the fan was varied between maximum (duty cycle 1.0) and 20%. Here, one also recognizes the good qualitative agreement. The impedance firstly drops steeply, since the cooling improves with increasing air, and the air which is not so warm removes less humidity and thus dries the cell to a lesser extent. A minimum of membrane resistance then occurs. If one further increases the air quantity, the impedance increases slightly, since the increasing air volume may carry out more humidity.

LIST OF REFERENCE NUMERALS 1 fuel cell stack
1' fuel cell stack
10 fuel cell
100 fuel cell arrangement
11 cathode current collector
11' cathode current collector
11" cathode current collector
12 separator structure
12' separator structure
120 channels
13 fuel distribution structure
13' active region of the fuel cell
14 fuel distribution accesses
15 current contacting field
16' extension
16" region projecting into the cooling channel
2 housing
20 cooling channel
21 cooling channel
22 inlet
23 inlet
24 outlet
25 outlet
26 device for changing the cross-sectional area
30 ventilation device
31 fan
4' membrane electrode module (MEA)
A cross-sectional area
B cross-sectional area
C cross-sectional area
G gas flow
G' gas flow
Q1 cross-sectional area
Q2 cross-sectional area
S gas flow

The invention claimed is:

1. A fuel cell arrangement comprising:
a housing;
a fuel cell stack arranged in the housing, the fuel cell stack comprising at least one fuel cell, stacked one after the other in the stack direction, the at least one fuel cell including an anode, an ion exchange unit and a cathode, the at least one fuel cell including an active region perpendicular to the stack direction; cathode channels arranged running perpendicularly to the stack direction in a first direction for cathode-side gas exchange; and
a ventilation unit including a first cooling channel having an inlet and an outlet, the first cooling channel running between the at least one fuel cell and the housing in a second direction, where the cathode channels are connected to the first cooling channel for cathode gas flow entrance and the outlet is connected to the ventilation unit;
a second cooling channel having at least one inlet and an outlet, the second cooling channel running in the second direction between the at least one fuel cell and the housing wherein the outlet is connected to the cathode channels;
wherein the ventilation unit produces a gas flow in the first cooling channel and in the second cooling channel, so that a first pressure prevails in the first cooling channel and a second pressure prevails in the second cooling channel, wherein a difference between the first and the second pressure effects a gas flow through the cathode channels of a separator structure arranged in the cathode side, wherein the difference is such that the gas flow through the separator structure is smaller than the gas flow through the first or second cooling channel by a factor between 5 and 1000; and
at least one cathode current collector and/or at least one anode current collector that projects from the active region into the first cooling channel and up to an inner edge of the housing.

2. A fuel cell arrangement according to claim 1, wherein, via the separator structure oxygen-containing gas may be led to the cathode and/or via the separator structure an electric contacting to the cathode is ensured.

3. A fuel cell arrangement according to claim 2, wherein the separator structure comprises at least one bipolar plate.

4. A fuel cell arrangement according to claim 1, wherein at least one cathode current collector and/or at least one anode current collector projects into the second cooling channel.

5. A fuel cell arrangement according to claim 1, wherein the first and the second cooling channel are located on two sides of the fuel cell stack which lie opposite one another.

6. A fuel cell arrangement according to claim 1, wherein a cross-sectional area of the first cooling channel is larger than a cross-sectional area of the second cooling channel.

7. A fuel cell arrangement according to claim 1, wherein the inlets and the outlets of the first and/or second cooling channels have different cross-sectional areas perpendicular to the second direction.

8. A fuel cell arrangement according to claim 7, wherein the inlet and/or the outlet of the first cooling channel includes means for adjusting a size of the cross-sectional area of the inlet and/or the outlet.

9. A fuel cell arrangement according to claim 1, wherein the ventilation unit includes a single fan for producing a gas flow in the first and/or second cooling channels.

10. A fuel cell arrangement according to claim 1, wherein the at least one fuel cell is a bi-fuel cell.

11. A fuel cell arrangement according to claim 1, wherein the fuel cell stack comprises a plurality of fuel cells.

12. A fuel cell arrangement according to claim 1, wherein the fuel cell is a direct methanol fuel cell or a proton exchange membrane fuel cell.

* * * * *